United States Patent [19]

Haley

[11] 4,170,245

[45] Oct. 9, 1979

[54] DIGITAL CONTROL VALVE

[75] Inventor: Frank P. Haley, Upland, Calif.

[73] Assignee: FMC Corporation, San Jose, Calif.

[21] Appl. No.: 883,423

[22] Filed: Mar. 3, 1978

[51] Int. Cl.² .............................................. G05D 7/03
[52] U.S. Cl. ................................. 137/487.5; 137/599
[58] Field of Search ............................. 137/487.5, 599

[56] References Cited

U.S. PATENT DOCUMENTS

| | | |
|---|---|---|
| 2,790,680 | 4/1957 | Rosholt . |
| 3,010,316 | 11/1961 | Snyder ............................ 137/599 X |
| 3,063,468 | 11/1962 | Dufour . |
| 3,072,146 | 1/1963 | Gizeski . |
| 3,331,393 | 7/1967 | Ernyei . |
| 3,343,566 | 9/1967 | Luckenbill . |
| 3,349,798 | 10/1967 | Allen . |
| 3,746,041 | 7/1973 | Friedland . |
| 3,785,389 | 1/1974 | Friedland . |
| 3,905,394 | 9/1975 | Jerde . |
| 3,937,248 | 2/1976 | Hutton . |
| 3,942,553 | 3/1976 | Gallatin . |

*Primary Examiner*—Robert G. Nilson
*Attorney, Agent, or Firm*—J. F. Verhoeven; W. W. Ritt, Jr.

[57] ABSTRACT

A digital valve has a valve body with an inlet passage and two outlet passages straddling the inlet passage. A plurality of slots are cut in the body connecting the inlet passage to each outlet passage. Bores in the valve body intersect each slot, and a plunger in each bore blocks or opens the slot. The slots vary in width in a binary progression, and solenoids, controlled by a central processing unit through solid state relays, selectively actuate the plungers so that a desired flow through the valve can be effected. Upstream and downstream sensors are connected to the central processing unit, which is within the valve, to modify the actuation of the plungers in order to provide a predetermined flow at the instantaneous temperature of the fluid and the instantaneous pressure drop across the valve.

10 Claims, 8 Drawing Figures

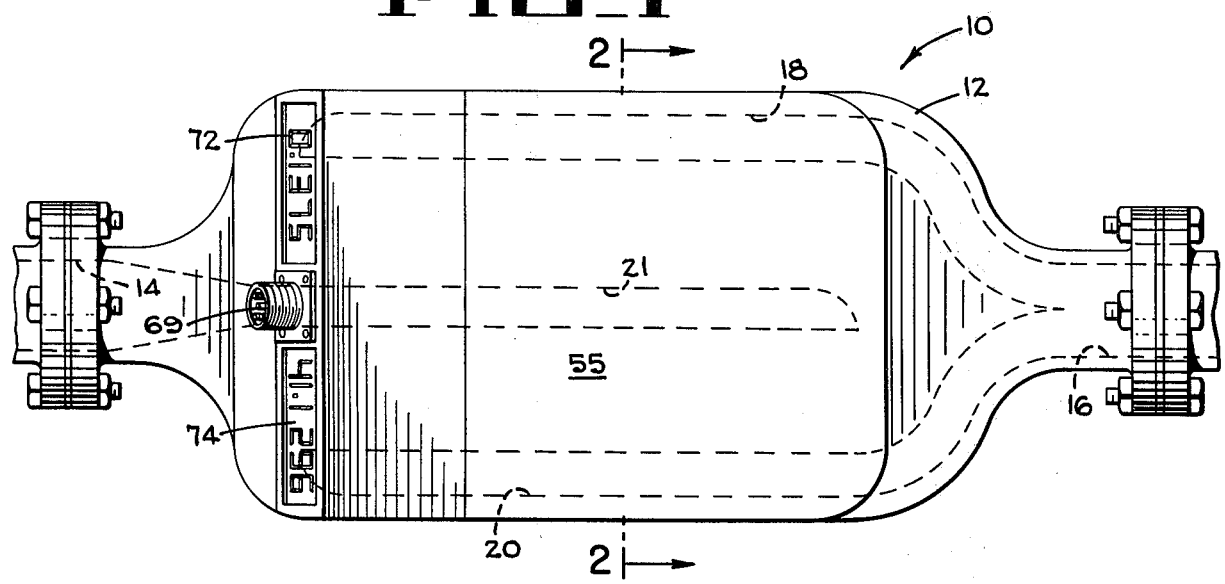
FIG_1
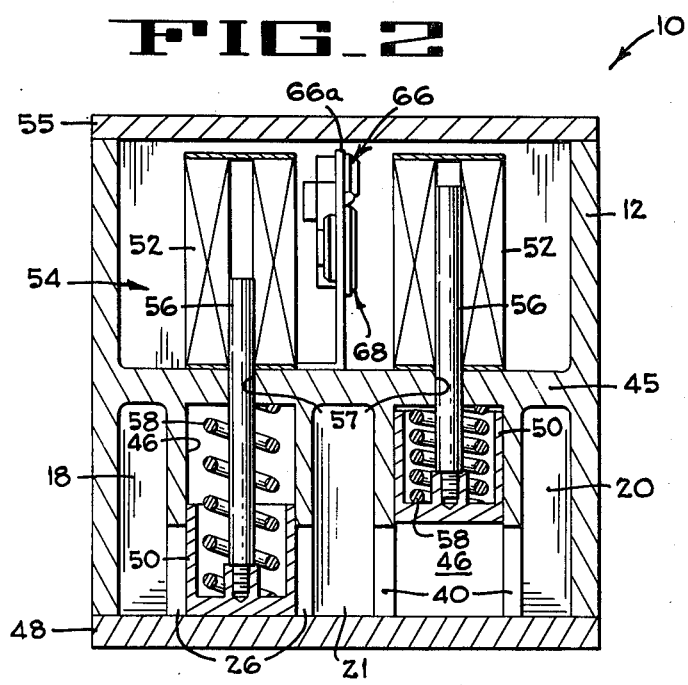
FIG_2

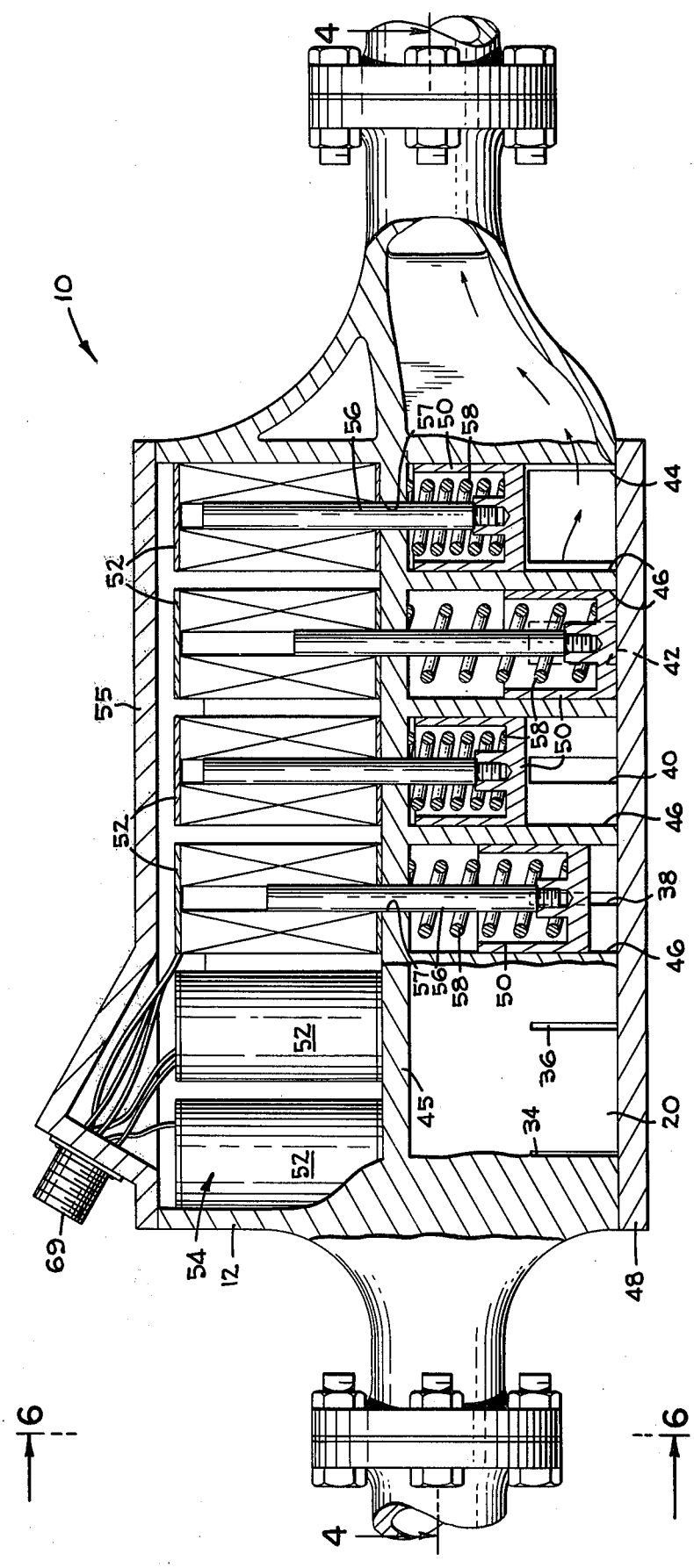

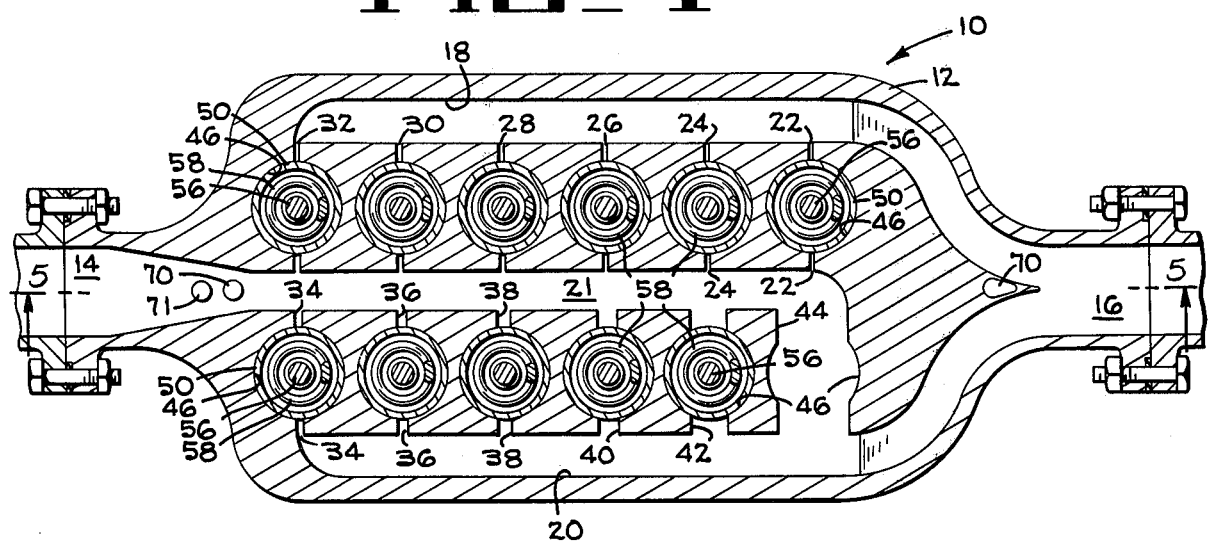
FIG_4
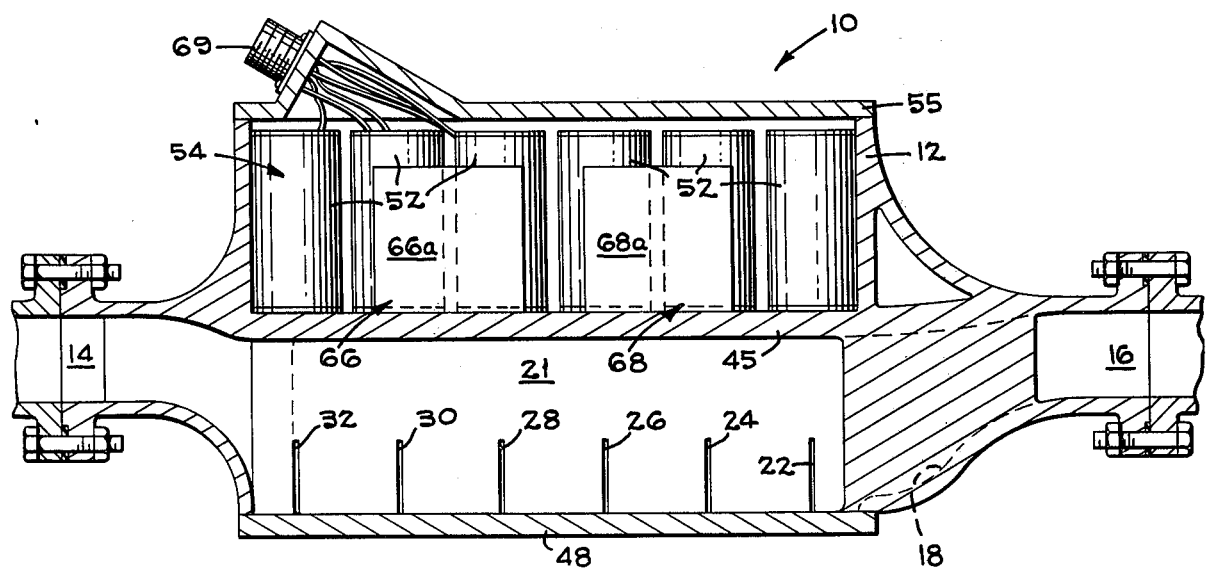
FIG_5

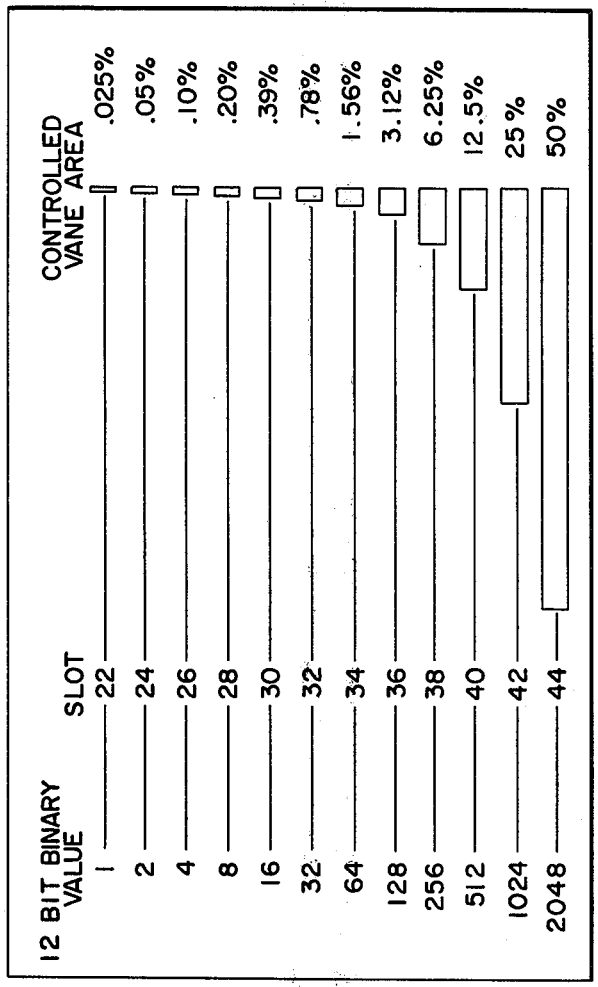
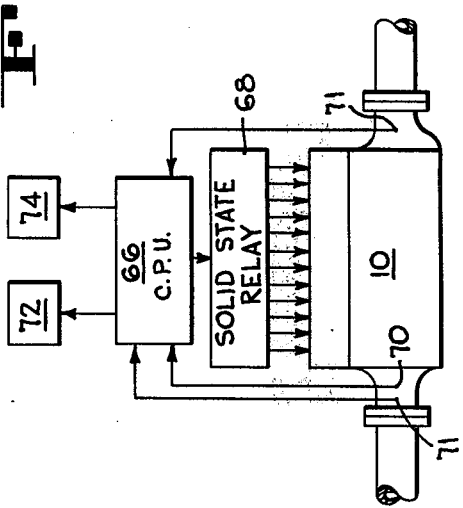
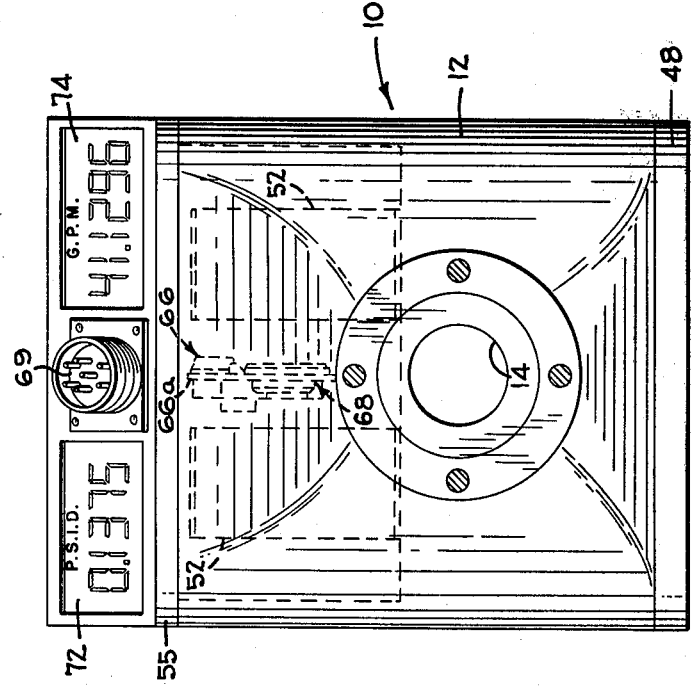

DIGITAL CONTROL VALVE

BACKGROUND OF THE INVENTION

1. Field of the Invention

The present invention relates to digital valves, and, more particularly, to a simple valve construction which can be manufactured to provide a precise flow control.

2. Description of the Prior Art

In present day process control systems involving the control of fluid, digital computers play an ever increasing part in automating the control of the fluid flow. Recent developments in microcomputer technology have simplified the automatic control of elements, such as valves. Since the computer output signal is digital in nature, any valve which can respond directly to digital signals is greatly preferred over conventional valves in the precision automatic control of fluid.

Many United States patents disclose digital valves, such as U.S. Pat. Nos. 3,063,468; 3,072,146; 3,331,393; 3,746,041; 3,785,389; 3,905,394; 3,937,248; and 3,942,553. These patents, and other patents noted hereinafter, disclose specific features of valves which are desirable for a simple, automatic controlled, digital valve. For example, several valve patents, including U.S. Pat. Nos. 2,790,680; 3,063,468; 3,072,146; 3,343,566; 3,349,798; and 3,746,041 disclose a rectangular slot, or slots, for the control of fluid flow. U.S. Pat. No. 3,331,393 discloses a valve body having an inlet passage with an outlet passage on either side thereof, and some digital valve patents (U.S. Pat. Nos. 3,785,389 and 3,905,394) disclose a computer controlled digital valve with a sensor providing signals to the computer.

SUMMARY OF THE INVENTION

In the valve construction of the present invention, applicant has provided a valve body with an inlet opening and an outlet opening, a plurality of slots of rectangular cross-section connecting said first and second passages, and means defining a bore intersecting each of said slots with a plunger in each bore shiftable between a slot-open and a slot-closed position. Means are also provided to shift selected plungers to the slot-open position to provide a flow path of predetermined area between the inlet opening and the outlet opening.

It is therefore one object of the present invention to provide a simple, easily manufactured, precision digital valve.

BRIEF DESCRIPTION OF THE DRAWINGS

FIG. 1 is a plan view of the valve of the present invention connected in a pipeline.

FIG. 2 is a view taken on the line 2—2 of FIG. 1.

FIG. 3 is a side view of the valve of the present invention with one wall removed and with one portion broken away for clarity.

FIG. 4 is a view taken on the line 4—4 of FIG. 3.

FIG. 5 is a view taken on the line 5—5 of FIG. 4.

FIG. 6 is a view taken on the line 6—6 of FIG. 3.

FIG. 7 is a chart showing the percent of total flow which passes through each slot.

FIG. 8 is a schematic diagram of the automatic control elements of the valve.

DESCRIPTION OF THE PREFERRED EMBODIMENT

There is shown in FIGS. 1 to 6 a valve 10 having a valve body 12. As shown best in FIG. 4, the valve body has an inlet opening 14 and an outlet opening 16. Two spaced apart blind passages 18 and 20 terminate at the outlet opening 16; and a single blind passage 21, which is located between the passages 18 and 20, terminates at inlet opening 14.

A plurality of slots 22, 24, 26, 28, 30 and 32 extend between passages 18 and 21; and a plurality of slots 34, 36, 38, 40, 42, 44 extend between passages 20 and 21. Thus, the passages 21 extending from the inlet opening is connected by slots 22 to 32 to the passage 18 leading to the outlet opening; and the inlet passage 21 is connected to the other outlet passage 20 by slots 34 to 44. Flow can occur from inlet passage 21 to outlet passages 18 and 20 through any slot not blocked.

Each of the slots 22 to 44, which are cut in the lower half of the valve body below intermediate web 45, is intersected by a cylindrical blind bore 46 in the valve body, as shown in FIGS. 3 and 4. The bores extend between the intermediate web 45, and a bottom plate 48 secured to the valve body, to define, for each bore, a chamber closed except for the diametrically opposed openings in the chamber walls defined by the slot. A plunger 50 is slidably received in each chamber and is slidable therein between an upper position and a lower position. One of the twelve plungers 50 has been omitted from FIG. 4 to illustrate better the intersection of one of the slots (44) with the bore 46. The slots 22 to 44 are vertical, and extend in length only from the bottom plate 48 to a point approximately midway between the bottom and top of the vertical bore, as shown in FIG. 3. The plunger 50 defines a barrier in the vertical bore to flow through the slot which is intersected by the bore. When the plunger is raised to an extreme upper (slot open) position in the bore, the slot (as, for example, slots 44 and 40) is unblocked and is fully open. When the plunger is lowered to an extreme lower (slot-closed) position in the bore, the slot (as, for example, slot 42) is blocked and is fully closed. The plunger may be lowered to some intermediate position in the bore to open the slot (as, for example, slot 38) partially.

The actuation of the plunger between the two positions (slot-open and slot-closed) is effected by a solenoid 52 received in a chamber 54 located above the intermediate web 45 and closed by a top plate 55. The chamber 54 is separated from the bores in the valve housing, but the plunger rods 56, connected to the plunger 50, extend through openings 57 for receipt within the solenoid. When the solenoid 52 is deenergized, a compression spring 58 (engaged with web 45 and the plunger) forces the plunger down into a slot-closed position (see FIG. 3, slot 42). When the solenoid is energized at rated voltage (e.g., 110 volts), the plunger is raised to the upper, slot-open position shown in FIG. 3, slot 40. At some intermediate voltage, say ½ rated voltage, the plunger will rise to approximately ½ the full open position (½ the length of the slot) as shown by slot 38.

The slots 22 to 44 are all the same height but are all of different width. They are all of rectangular cross-section. The slots vary in width according to a binary progression (wherein each slot is twice the width of the preceding slot) with the slot 22 the narrowest and the slot 44 the widest. There are twelve slots leading from the passage 21 connected to the inlet opening to one 18 or the other 20 of the passages connected to the outlet passage. Since flow from the inlet opening to the outlet opening must pass through the slots, the rate of flow will be determined by which slots are open and which are closed. If all slots are closed (by deenergization of all solenoids) no flow will occur. If all slots are open (by full energization of all solenoids) flow will occur at a rate 100% of the capacity of the valve. If some slots are open and some are closed (by energization of selected solenoids) a flow rate will occur representing the total rate of the flow through the separate slots which are open. A chart representing the percentage of flow rate through each slot is shown in FIG. 7. If, by way of example, the slots 22, 24, 28, 34, 42 and 44 are fully open, and the remaining slots closed, flow will occur through the respective slots at a rate in the following percentages: 0.025; 0.05; 0.20; 1.56; 25; and 50, for a total flow rate of 76.835% of capacity. Since the total flow rate capacity of the valve is known, a very accurate flow rate can be maintained by selecting the appropriate slots to open and close. If an additional 0.05% of flows is desired, the slot 26 (rated capacity=0.10%) can be opened half way.

It should be noted that the design of the valve lends itself to easy and inexpensive manufacture without a sacrifice of the precision required in a digital flow control valve. The slots are easy to mill accurately, and the plungers effectively block and unblock the slots without complicated operating mechanism.

The valve will pass a predetermined rate of flow at a given pressure differential across the valve and at a given temperature of the liquid, with the valve fully open. This rated flow can be expressed as $$Q = K(P_2 - P_1)/SG$$

where $P_2$ is the inlet pressure; $P_1$ is the outlet pressure; SG is the specific gravity of the fluid; and K is constant.

There is provided in the valve a central processor unit 66 on an electronic printed board; 66a, and a plurality of solid state relays 68 on an electronic printed board 68a. Voltage at 110 volts AC is introduced to the valve at connector 69 through a cable (not shown), for connection to the solenoids. Signals to or from a computer can also be fed through the cable and the connector.

In the first instance, the valve is set to pass fluid at a desired rate of flow based on the given pressure drop $P_2-P_1$ and the given specific gravity SG. Signals representing the desired rate of flow are supplied by the central processing unit (C.P.U.) to the solid state relays to energize appropriate solenoids. The solenoids operate the plungers to open the appropriate slots to give the desired rate of flow.

A pressure sensor 70 is provided in the fluid stream at the inlet and the outlet of the valve, and a temperature sensor 71 is located in the fluid stream at the inlet to the valve. The sensors sense the instantaneous values of pressure and temperature and transmit signals to the C.P.U. to modify (through the solid state relays) the operation of the plungers to maintain the desired flow, if the instantaneous values of pressure and temperature differ from the given values $P_2-P_1$ and SG for these variables.

Two readout devices 72, 74 (to indicate pressure across the valve and fluid flow, respectively) are operated by signals from the C.P.U. 66 to give a visual indication of pressure across the valve and the rate of flow.

Although the best mode contemplated for carrying out the present invention has been herein shown and described, it will be apparent that modification and variation may be made without departing from what is regarded to be the subject matter of the invention.

What is claimed is:

1. A valve having a valve body with an inlet opening and an outlet opening, a first passage in communication with said inlet opening and a second passage in communication with said outlet opening, a plurality of slots of rectangular cross-section connecting said first and second passages, means defining a bore intersecting each of said slots, and a piston in each bore shiftable between a slot-open and a slot-closed position, and means to shift selected pistons to the slot-open position to provide a flow path of predetermined area between the inlet opening and the outlet opening.

2. The valve of claim 1 in which said slots are of different width.

3. The valve of claim 1 including a central processor chip within the valve to control said piston shifting means.

4. A valve having a valve body with an inlet opening and an outlet opening, a plurality of passages in said valve body connected alternately to one and the other of said openings, a plurality of slots of rectangular cross-section connecting adjacent passages, means defining a bore intersecting each of said slots, and a piston in each bore shiftable between a slot-open and a slot-closed position, and means to shift selected pistons to the slot-open position to provide a flow path of predetermined area between the inlet opening and the outlet opening.

5. The valve of claim 4 wherein said slots are all of different width.

6. The valve of claim 4 including sensors to measure the parameters of flow and a central processor chip within the valve to control said piston shifting means in response to said sensors.

7. A valve having a valve body with an inlet opening and an outlet opening, first and second spaced apart passages in said valve body terminating at one of said openings, a third passage in said valve body passing between said first and second passages and terminating at the other of said openings, a plurality of slots of rectangular cross-section connecting said first and third passages and a plurality of slots of rectangular cross-section connecting said second and third passages, all of said slots being of different width, a bore intersecting each of said slots, means in each bore defining a barrier for the slot and shiftable in the bore between a slot-open and a slot-closed position, and means to shift selected barriers to the slot-open position to provide a flow path of predetermined area between the inlet opening and the outlet opening.

8. The valve of claim 7 including sensors upstream and downstream of said slots to measure parameters of the fluid flow and a central processor chip within the valve to control said barrier shifting means in response to said sensors.

9. A valve having a valve body with an inlet opening and an outlet opening, first and second spaced apart passages in said valve body terminating at one of said openings, a third passage in said valve body passing between said first and second passages and terminating at the other of said openings, a plurality of slots of rectangular cross-section connecting said first and third passages and a plurality of slots of rectangular cross-section connecting said second and third passages, said slots all being of different width, a cylindrical bore intersecting each of said slots, a piston in each bore defining a barrier for the slot and shiftable in the bore between a slot-open and a slot-closed position, and means to shift selected barriers to the slot-open position to provide a flow path of predetermined area between the inlet opening and the outlet opening.

10. The valve of claim 9 including a temperature sensor and pressure sensors upstream and downstream of said slots to measure these parameters of the flowing fluid, and a central processor chip within the valve to control said barrier shifting means in response to said sensors.

* * * * *